July 17, 1956     A. SOULET     2,754,642
CARRIER FOR GRINDWHEELS FOR THE TRUING OF VALVE SEATS
Filed May 1, 1953
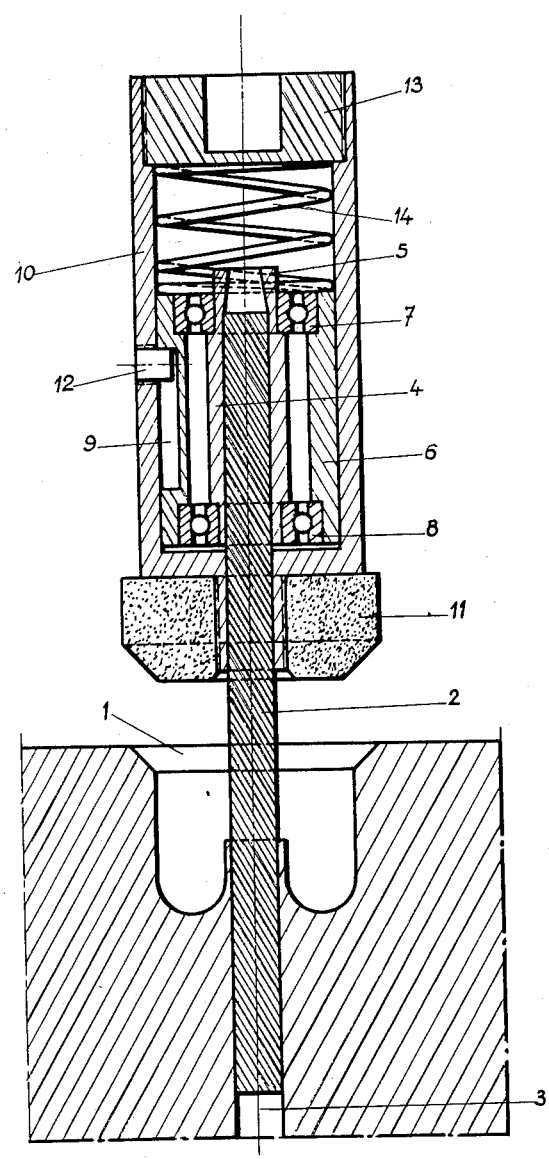

United States Patent Office 2,754,642
Patented July 17, 1956

2,754,642

CARRIER FOR GRINDWHEELS FOR THE TRUING OF VALVE SEATS

Armand Soulet, Realmont, France

Application May 1, 1953, Serial No. 352,398

Claims priority, application France May 14, 1952

2 Claims. (Cl. 51—241)

The object of my invention is a carrier for grindwheels for the truing of valve seats.

Arrangements of this kind are already known, wherein the guiding means are such that the grindwheel has to engage the valve seat before the grindwheel is started rotating. Such prior arrangements include a sleeve fitted over a guiding rod engaging an opening provided for the valve and driven into rotation by any suitable driving means.

Now, when the grindwheels have low rotary speeds, their operation is defective, and this is the case more particularly at the start as long as the grindwheel does not run at its normal running speed, and also during the period of slowing down preceding the final stoppage. During these starting and slowing down stages, the valve seat is thus readily scored while the grindwheel is abnormally worn. The grindwheel carrier, according to my invention, includes a centering device that is held in the opening provided for the valve stem, a sleeve carrying the grindwheel and revolubly fitted round said centering device and means provided on said sleeve for connecting it with driving means, the novelty of the arrangement consisting in the fact that the sleeve is capable of sliding longitudinally with reference to the centering device in order to bring the grindwheel into and out of contacting relationship with the valve seat, elastic means being inserted between the centering device and the sleeve with a view to urging the grindwheel away from the valve seat.

With such a grindwheel carrier, it is possible to start the grindwheel rotating at normal speed or to stop it when it is spaced away from the valve seat, the grindwheel being set in contact with the seat of the valve to be trued against compression of the yielding means.

I will now describe with reference to the single figure of accompanying drawing a preferred embodiment of my improved carrier for a grindwheel intended for the truing of valve seats, said figure being a vertical axial cross-section of said carrier.

In the said figure, I have shown the device as positioned on the valve seat 1 to be trued. A cylindrical guiding rod 2 of conventional type is introduced into the guide 3 provided for the valve stem. Over said guiding rod 2, is fitted with slight friction, a sleeve 4 the upper end 5 of which is frustoconical and is adapted to be wedged over the end of the guiding rod, so as to make said two parts rigid with each other. A second cylindrical sleeve 6 is revolubly mounted round the sleeve 4 coaxially with reference thereto with the interposition between the two sleeves of two ball bearings 7 and 8. The outer sleeve 6 is provided externally along one of its generating lines with a longitudinal groove 9.

Round the sleeve 6 is fitted the longitudinally slidable body 10 over the end of which is screwed the grindwheel 11, said cylindrical body being provided on its inner surface with a stud 12 slidingly engaging the groove 9, so as to constrain said cylindrical body 10 to rotate in unison with the sleeve 6. Said cylindrical body is closed at its upper end by a plug 13 provided outwardly with a six-sided depression while a spring 14 acting under compression is fitted between said plug and the upper terminal surface of the outer sleeve 6.

It is apparent that by connecting the cylindrical body with the driving means, said cylindrical body and the grindwheel rigid therewith will revolve in unison with the sleeve 6. When pressure is exerted through the driving means, the spring 14 is compressed and the cylindrical body 10 slides longitudinally of the sleeve 6 so as to bring the grindwheel 11 into contact with the seat 1. When the pressure on the spring 14 is released, the grindwheel moves away from the seat under the action of the spring 14 and it is consequently possible to stop the grindwheel without the latter being in contact with the valve seat.

What I claim is:

1. A grinding mechanism for the truing of valve seats, provided with an opening for the valve stem, comprising a centering member engaging the opening in the seat, two co-axial sleeves revolubly mounted with reference to each other and coaxially arranged with reference to the centering member, ball bearings spacing the two sleeves to allow their relative rotary movement, the inner sleeve being fitted over the centering member, a cylindrical body carrying the grindwheel slidingly engaging the outer sleeve and rotating in unison therewith and adapted to be shifted into engagement with the valve seat through longitudinal movement over the outer sleeve, a compression spring fitted between the cylindrical body and the outer sleeve to urge the grinding wheel away from the valve seat and means for imparting a rotary movement to the sleeve.

2. A grinding mechanism for the truing of valve seats, provided with an opening for the valve stem comprising a centering member engaging the opening in the seat, two coaxial sleeves revolubly mounted with reference to each other and coaxially arranged with reference to the centering member, ball bearings spacing the two sleeves to allow their relative rotary movement, the inner sleeve having an outer end assuming a frustoconical shape wedged over the free end of the centering member, a cylindrical body carrying the grindwheel slidingly engaging the outer sleeve and rotating in unison therewith and adapted to be shifted into engagement with the valve seat through longitudinal movement over the outer sleeve, a compression spring fitted between the cylindrical body and the outer sleeve to urge the grinding wheel away from the valve seat and means for imparting a rotary movement to the sleeve.

References Cited in the file of this patent

UNITED STATES PATENTS

| | | |
|---|---|---|
| 2,042,759 | Albertson | June 2, 1936 |
| 2,314,028 | Beckwith | Mar. 16, 1943 |
| 2,354,184 | Daniel | July 25, 1945 |
| 2,525,119 | Dunn | Oct. 10, 1950 |
| 2,611,223 | Emge | Sept. 23, 1952 |